3,356,518
PROCESS OF INSOLUBILIZING PROTEIN WITH A TERTIARY AMINE OXIDE AND A WATER SOLUBLE FERRIC SALT
Daniel P. Gilboe, Minneapolis, Minn., and Garson P. Shulman, Baltimore, Md., assignors, by mesne assignments, to Ashland Oil & Refining Company, a corporation of Kentucky
No Drawing. Filed Jan. 22, 1965, Ser. No. 427,511
11 Claims. (Cl. 106—154)

This invention relates to a method of insolubilizing proteins and to novel cross-linkable protein compositions. More particularly, this invention relates to protein compositions containing latent cross-linking agents.

It is well known to the art that formaldehyde will react with proteins to yield insoluble products or otherwise denature them. Although a great deal of speculation has arisen concerning the actual chemical reactions involved, their precise nature is still far from clear. Despite this fact, however, commercial processes of many kinds have been developed based upon this general reaction. Formaldehyde or acetaldehyde is used, for example, to insolubilize proteins for adhesive applications, paper coatings, fiber production, plastics manufacture, tanning, and the like. In all these operations, however, the process is difficult to control in view of the nature of the reaction occurring between the protein and the aldehyde. Aqueous solutions of aldehyde, furthermore, are difficult to handle. In view of the reactivity of the aldehyde, premature reaction between the aldehyde and the protein can readily occur and thus prevent the proper application of the protein composition. The inability to thoroughly suppress the reaction of the aldehyde with the protein at temperatures at which the protein composition is applied has severely limited the use of such compositions in industry.

Commercial processes for paper coating involve the treatment of paper with solutions of protein containing the aldehyde. If the aldehyde is too concentrated, immediate thickening of the solution results and the protein is rendered unavailable. Furthermore, on continuous running of such coating operations, protein solutions containing aldehyde have a tendency to thicken gradually so that operating conditions have to be varied and the coating bath eventually becomes useless. Moreover, the volatility of the aldehyde component of this coating mixture is such as to make rapid insolubilization by heating difficult to control. In commercial practice, therefore, the paper industry has resorted to separate treatments in order to achieve crosslinking by the reaction of casein, soya protein, or gelatin coatings with aldehyde.

Proteins have also been utilized as a binder for pigments in textile printing. They are then insolubilzed with the aldehyde. If this insolubilization is carried out by passing the printed goods through steam and aldehyde vapors, there is danger that only a surface reaction will occur. If the aldehyde is added directly into the printing paste, although more durable fixation results, it is again difficult to control the coagulating effect of the aldehyde because it is necessary to steam the goods, or expose them to air, for a protracted period in order to develop insolubility and this process is likewise hard to control.

It is therefore one of the objects of the present invention to provide novel protein compositions capable of cross-linking. It is another object of the present invention to provide protein compositions containing latent cross-linking agents which are activated by heating. It is still a further object of this invention to provide methods for controlling the cross-linking reaction of protein such as not to interfere in the application or forming steps but to result in cross-linking on further heating after application. Other objects will become apparent hereinafter.

The objects of the present invention are accomplished by a protein composition containing as a latent cross-linking agent a tertiary amine oxide compound having the general formula

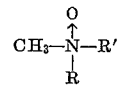

wherein R and R' are radicals selected from the class consisting of hydrocarbyl radicals having from one to ten carbon atoms and 2 - hydroxyhydrocarbyl radicals having from one to ten carbon atoms, and a catalyst comprising ferric ions. The term hydrocarbyl radical as employed herein is meant to include all monovalent hydrocarbon radicals. In the presence of protein and ferric ions it was discovered that the tertiary amine oxides having the stated formula decompose to result in formaldehyde at elevated temperatures. The formaldehyde released causes the cross-linking of the protein as evidenced by gelling of the protein. The decomposition generally occurs at temperatures above 70° C.

The compositions of the present invention are generally prepared by dissolving or dispersing the protein in an aqueous medium and admixing an iron salt capable of forming the ferric ion and the amine oxide with the solution or dispersion. The preparation of protein solutions and dispersion is known in the art. Such protein solutions or dispersions react most advantageously with the amine oxide at a pH above 7. If it is desired to obtain dry proteins containing the described cross-linking agents and catalysts, the protein may be precipitated out of the solution or dispersion or a solution or dispersion of the latent cross-linking agent and the catalyst sprayed on the solid protein. If the composition is precipitated out of solution or dispersion, it is desirable to employ an excess of the cross-linking agent and the catalyst to assure that sufficient quantities of both reagents are precipitated with the protein.

The proteins useful in the formation of the compositions of the present invention include protein of animal and vegetable origin, and mixtures thereof. The term vegetable proteins is meant to include flours of such oleaginous seeds as soybean, peanut, cottonseed, linseed, sesame seed, castor beans, sunflower seed, safflower seed, and the like. The term animal protein is meant to include not only milk casein and hide and bone glue, but also blood albumin, gelatin, fish glue, egg albumin, and the like. The preferred compositions are, however, the oil seed proteins, and more particularly, the soybean proteins. It will be apparent that the proteins usable in the process of the present invention need not be pure proteins but can be proteinaceous materials that contain in addition to the protein considerable quantities of inert ingredients, e.g., up to 50 percent.

The preferred amine oxides of the present invention are the trialkyl amine oxides in which at least one alkyl group is a methyl group, and the alkyl methylethanolamine oxides. Representative amine oxides suitable as latent cross-linking agents are such compounds as trimethylamine oxide, methyldiethylamine oxide, dimethylethylamine oxide, propyldimethylamine oxide, dipropylmethylamine oxide, dimethylhexylamine oxide, dimethylethanolamine oxide, methylethylethanolamine oxide, methyldiethanolamine oxide, methylpropylethanolamine oxide, dimethyl-2-propanolamine oxide, and similar compounds. The concentration of the latent cross-linking agent admixed with the protein will vary depending on the degree of cross-linking desired. In general the concentration will vary from 0.1 to 10 percent by weight of the protein. Optimum concentrations are readily established experimentally and should be such as to result in the desired degree of cross-linking.

Any water soluble ferric salt can be employed to obtain the necessary ferric ions to catalyze the decomposition of the amine oxides to give rise to formaldehyde. By solubility in water is meant sufficient solubility to give rise to ferric ions in the catalytic concentration. Suitable iron salts are ferric chloride, ferric bromide, ferric sulfate, ferric acetate, ferric nitrate, and similar salts. It is believed that the catalytic activity of the ferric ion is based on an inherent chelating action that occurs when the iron salt is admixed with the protein. Thus amino acids contained in the protein are capable of chelating the ferric ion and the resulting chelate in effect causes the catalysis of the amine oxide decomposition. Although not necessary to obtain the decomposition of the amine oxide, it is sometimes advantageous to include an external chelating agent for the ferric ion. Suitable ferric ion chelating agents are described in "Chemistry of the Metal Chelate Compound" by Martel & Calvin, Prentice-Hall, Inc., New York, 1952. The external chelating agents generally suitable for use in the present invention comprise polycarboxylic acids such as oxalic acid; hydroxycarboxylic acids such as citric acid, tartaric acid, tartonic acid, maleic acid, and lactic acid; and amino acids, such as ethylenediminetetraacetic acid, aminoacetic acid, and aspartic acid. The preferred external chelating agents are citric acid, oxalic acid, and ethylenediaminetetraacetic acid. The concentration of the iron salt employed is generally kept within the range of 0.01 to 10 and preferably within the range of 1 to 5 percent by weight of the amine oxide. If an external chelating agent is employed, the concentration of such is kept directly proportional to the concentration of the iron salt assuming a complete reaction of the ferric iron with the chelating agent.

The invention is further illustrated by the following examples, which, however, are not to be construed as limitative of the invention. Unless otherwise indicated all concentrations are on a weight basis.

*Example 1*

A 20 percent dispersion of solvent-extracted soybean meal in water is prepared by admixing the components at 70–80° F. and adding 0.5 percent of Nopco 1819–L, a commercially available defoamer. To this reaction is then added 2 percent of sodium hydroxide, based on the weight of the soybean meal, to adjust the dispersion of the soybean meal to a pH of 10–10.5. To this dispersion is then added trimethylamine oxide and ferric chloride in a weight ratio of soybean meal to trimethylamine oxide to ferric chloride of 100–2–0.1. The resulting slurry is stable at room temperatures for an indefinite period of time. When the slurry is heated to 80° C. a gel is formed within a period of two minutes. On cooling to room temperature the gel becomes firm and solid.

*Example 2*

The procedure of Example 1 is repeated employing instead of the trimethylamine oxide, dimethylethanolamine oxide. Again the protein slurry gels at about 80° C.

*Example 3*

The procedure of Example 1 is repeated using diethylmethylamine oxide. Gelling of the protein slurry occurs at 80°–85° C.

*Example 4*

The procedure of Example 1 is repeated using solvent extracted cottonseed meal instead of the soybean meal. The resulting slurry starts to gel at about 80° C.

*Example 5*

The procedure of Example 1 is repeated using in addition to the ferric chloride 0.5 part of ethylenediaminetetraacetic acid. Gelling of the slurry occurs at 70–75° C.

The foregoing examples have described the preparation of the compositions of the present invention and gelation of the described latent cross-linking agent on heating. The foregoing procedures are not to be considered as the only methods of forming the composition of the present invention. Using the foregoing procedures, however, it is possible to form the compositions of the present invention with the reagents hereinabove defined which have not been specifically illustrated.

The compositions of the present invention can be employed in the manner known to those skilled in the art in a wide variety of applications employing a cross-linked protein. Thus the compositions of the present invention can be employed as adhesives, sizing compositions, coating compositions, and in similar applications.

What is claimed is:

1. A composition comprising a protein containing a compound having the general formula

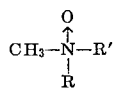

wherein R and R' are radicals selected from the class consisting of hydrocarbyl radicals having from one to ten carbon atoms and 2-hydroxyhydrocarbyl radicals having from one to ten carbon atoms and a water soluble ferric salt.

2. A protein composition comprising protein, from 0.1 to 10 percent by weight of the protein of a tertiary amine oxide compound having the general formula

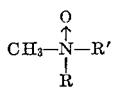

wherein R and R' are radicals selected from the group consisting of hydrocarbyl radicals having from one to ten carbon atoms and 2-hydroxyhydrocarbyl radicals having from one to ten carbon atoms and 0.01 to 10 percent by weight of the tertiary amine oxide of a water soluble ferric salt.

3. The protein composition of claim 2 wherein the protein is a vegetable protein.

4. The protein composition of claim 2 wherein the tertiary amine oxide is trimethylamine oxide.

5. The protein composition of claim 2 wherein the tertiary amine oxide is dimethylethanolamine oxide.

6. The protein composition of claim 2 wherein the ferric ion is chelated with an external chelating agent.

7. The protein composition of claim 6 wherein the external chelating agent is ethylenediaminetetraacetic acid.

8. The process of cross-linking proteinaceous materials which comprises admixing a protein with a tertiary amine oxide compound having the general formula

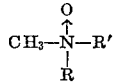

wherein R and R' are radicals selected from the class consisting of hydrocarbyl radicals having from one to ten carbon atoms and a water soluble ferric salt at a temperature below 70° C. and thereafter heating the mixture to a temperature above 70° C.

9. The process of claim 8 wherein the cross-linking agent is trimethylamine oxide.

10. The process of claim 8 wherein the cross-linking agent is dimethylethanolamine oxide.

11. The process of claim 8 wherein the tertiary amine oxide compound is employed in a concentration of 0.1 to 10 percent by weight of the protein in the proteinaceous material and the ferric salt is employed in a concentration of 0.01 to 10 percent by weight of the tertiary amine oxide.

References Cited

UNITED STATES PATENTS

| | | | |
|---|---|---|---|
| 2,849,334 | 8/1958 | Hart | 260—115 |
| 3,320,078 | 5/1967 | Dunning et al. | 260—117 |

WILLIAM H. SHORT, *Primary Examiner.*

H. SCHAIN, E. M. WOODBERRY, *Assistant Examiners.*